Nov. 9, 1926.

Re. 16,462

W. M. REECE ET AL

THEFTPROOF ELECTRIC LIGHT BULB

Original Filed July 26, 1923

Inventors
Wilbur M. Reece,
Carl E. Tomlinson

By their Attorneys
Ward, Crosby & Smith

Reissued Nov. 9, 1926.

Re. 16,462

UNITED STATES PATENT OFFICE.

WILBUR M. REECE, OF ENTERPRISE, OREGON, AND CARL E. TOMLINSON, OF CHEHALIS, WASHINGTON, ASSIGNORS TO KULP THEFTPROOF LAMP COMPANY, OF CHICAGO, ILLINOIS, A CORPORATION OF ILLINOIS.

THEFTPROOF ELECTRIC-LIGHT BULB.

Original No. 1,517,584, dated December 2, 1924, Serial No. 653,948, filed July 26, 1923. Application for reissue filed December 22, 1925. Serial No. 76,978.

Our invention relates to improvements in electric bulbs and more particularly to means for locking the usual threaded shell of the bulb in a socket to prevent theft.

The object of the invention is to provide an extremely simple and inexpensive locking means of the character set forth which can only be released by breaking the bulb, thus placing it in a condition in which it cannot be used, even if stolen from the socket.

With the foregoing in view, the invention resides in the novel subject matter hereinafter described and claimed, the description being supplemented by the accompanying drawing.

Figures 1 and 2 are side elevations partly in section on lines 1—1 and 2—2 of Fig. 3.

Figure 3:
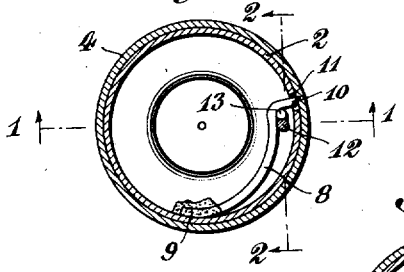
Figure 3 is a horizontal sectional view as indicated by lines 3—3 of Fig. 1, showing the locking means in operative position.

In the form of construction selected for illustration in the present application, we make use of an electric light bulb 1 having the usual threaded shell 2 at one end for reception in the well known socket 4. A sheet of fish skin paper or the like 5 extends across the shell 4 to separate the bulb anchoring cement 6 from the contact-carrying insulating end 7 of the shell 2, and in the space thus provided is a locking device. This locking device is preferably in the form of a spring arm 8 soldered or otherwise secured at one end to the shell 2, while its other end is formed with a pointed detent 10 passing outwardly through an opening 11 in the shell, said detent being beveled to a point as seen in Fig. 3, so that it will not interfere with threading of the shell into the socket 4, but will bite into the latter and prevent unthreading of said shell, unless the arm 8 is forced inwardly to the position shown in Fig. 4.

Figure 4:
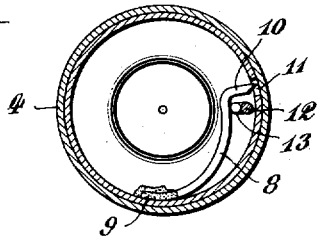
Figure 4 is a duplicate of Fig. 3 with the exception that it illustrates the locking means released.
Figure 6:
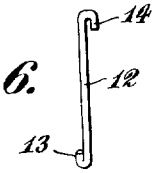
Figure 6 is a perspective view of the detent releasing stem and its handle and cam.

For releasing the arm 8 and detent 10, we have provided a stem 12 parallel with the axis of the shell, this stem being provided on one end with a cam 13 contacting with the outer side of the arm 8 and operative to force said arm inwardly to the position shown in Fig. 4 when the stem 12 is turned to the proper extent. The other end of the stem 12 is provided with an appropriate operating handle 14 and in the preferred form of construction, the cam and handle are both formed by bending the ends of the stem 12 substantially upon themselves, said stem being formed of a length of suitable wire, as seen most clearly in Fig. 6.

Figure 1:
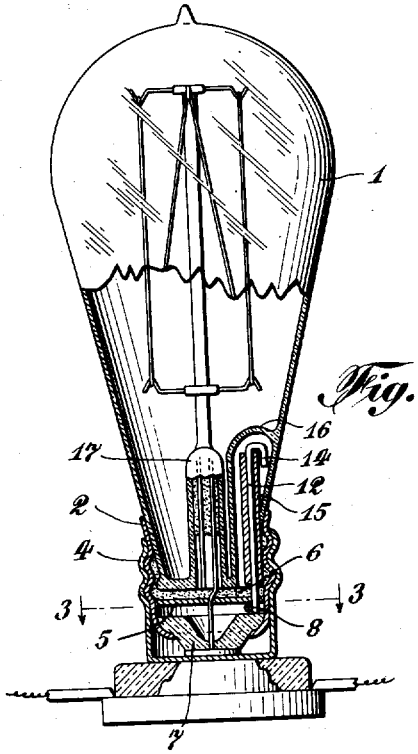
Figure 2:
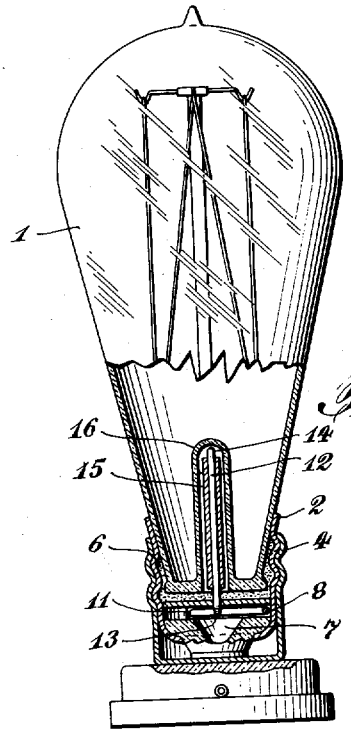
Figure 5:
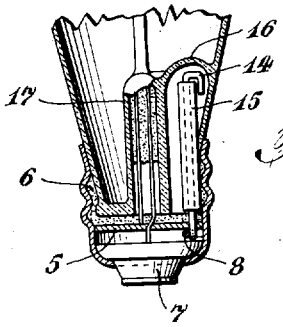
Figure 5 is a detail sectional view showing a slightly different form of construction.

To rotatably carry the stem 12, we prefer to provide a metal tube 15 soldered or otherwise secured to the inner side of the shell 2 and in order that air shall not enter the bulb around the stem, we provide said bulb with an internal seal 16 in the form of a tube which may be integral with the contracted end of the bulb and with the side wall thereof as illustrated in Figs. 1 and 2, or may also be integrally joined to the filament support 17 as depicted in Fig. 5. In either case, breakage of the bulb is necessary to permit rotation of the stem 12 and release of the detent 10 and hence theft of the bulb is prevented.

In assembling the device, the detent 8 is soldered or otherwise secured in the shell 2, above the insulator 7, the tube 15 is then soldered or otherwise secured to the inner side of the shell, the partition 5 is then inserted, and the bulb is then downwardly inserted into the shell, with the seal 16 passing over the tube 15 and handle 14, and said bulb is cemented in place, the current-conducting connections being established in the usual manner.

It is not desired to limit the invention to the details or examples herein described since it will be obvious to those skilled in the art, after understanding the invention, that various modifications and substitutions may be made without departing from the scope of the invention, and we aim therefore in the appended claims to cover all such modifications.

What is claimed as new and is desired to be secured by Letters Patent of the United States is:

1. An electric light bulb having the usual threaded shell, a locking device within said shell having a socket-engaging detent extending outwardly therethrough to hold said shell against unthreading from the socket, a releasing key for said locking device confined within said bulb and accessible only by breaking the same, and a seal around said releasing key preventing entrance of air around the same.

2. An electric light bulb having the usual threaded shell, a locking device in said shell having a socket-engaging detent extending outwardly therethrough to hold said shell against unthreading from the socket, a stem extending into the bulb and having one end operatively associated with said locking device for releasing said detent when the stem is turned, the other end of said stem having a handle confined in the bulb, and a seal around said stem and handle preventing entrance of air around the same.

3. An electric light bulb having the usual threaded shell, a locking device in said shell having a socket-engaging detent extending outwardly therethrough to hold said shell against unthreading from the socket, a stem extending into the bulb and having on one end a cam engaging said locking device for releasing the same, the other end of said stem having a handle confined in the bulb, and a seal around said stem and handle preventing entrance of air around the same.

4. A structure as specified in claim 3, said cam and handle being formed by bending the ends of said stem substantially upon themselves.

5. An electric light bulb, having the usual threaded shell, a locking device within said shell having a socket-engaging detent extending outwardly therethrough to hold said shell against unthreading from the socket, an open-ended tube secured to the inner side of said shell and extending into the bulb, a stem passing through said tube and operatively associated at one end with said locking device, the other end of said stem having an operating handle, and a seal around said tube and handle preventing entrance of air around the same.

6. A theft-proof electric lamp for use with a conventional electrical receptacle comprising a glass bulb having a threaded shell fixed to the stem thereof as by cement, and locking means permanently incorporated in the lamp base and permitting the lamp to be freely threaded into the receptacle but effecting positive engagement with the conventional threaded receptacle shell for securing the lamp against removal upon attempted turning movement in a direction to remove the lamp, said locking means being normally covered by the bulb and receptacle parts when the lamp is in operative position but having parts purposely designed to be freely exposed and manipulated to release the locking means upon breaking away the bulb glass.

7. A theft-proof electric lamp for use with a conventional electrical receptacle comprising a bulb member having permanently secured thereto a threaded shell to be received by the conventional threaded receptacle shell, a sharpened detent member extending from said threaded shell of the lamp in a direction whereby the lamp may be freely inserted into the receptacle but upon attempts to turn the lamp out of the receptacle said detent will bite into positive engagement with the receptacle shell wall and secure the lamp against removal, and detent releasing means normally covered by the bulb but being purposely designed to be freely exposed and manipulated to release the detent member upon breaking away the bulb glass.

8. In combination, a frangible enclosure for electrical apparatus, a cylindrical shell contact fixed on said enclosure, said shell contact being provided with means for engaging a conventional electrical receptacle by turning movement, and locking means fixed to said contact permitting the contact to be turned into a receptacle but having means for biting into the receptacle shell interior wall when rotational force is exerted to turn the contact outwardly of the receptacle, said locking means being normally covered by the enclosure and receptacle parts when in operative position but being releasable by a key member upon breaking away the frangible enclosure.

9. In combination, an electric lamp for use with a conventional electrical receptacle comprising a bulb member having permanently secured thereto a threaded shell to be received by the conventional threaded receptacle shell, and a locking means comprising a spring wire member extending substantially circumferentially along the wall of the lamp shell with one end retained against movement in respect to the lamp and its other end protruding for positive engagement with a receptacle when rotational force is exerted to turn the lamp outwardly of a receptacle, said locking means being normally covered and inaccessible when the lamp is in operative position in a receptacle but being purposely designed to be freely exposed and releasable upon breaking away the bulb glass.

10. An electric lamp comprising a bulb having the usual threaded shell, a locking device within said shell having a socket engaging detent extending outwardly therethrough to hold said shell against unthreading from the socket, said detent being formed with an arcuate shaped spring arm extending substantially along the wall of said shell, one end of said arm being fixed against movement with respect to the bulb and its other end being sharpened for extending into positive engagement with the socket, and a releasing portion of said locking device confined within the lamp, the bulb being sealed adjacent said releasing portion for preventing entrance of air around the same, said releasing portion being accessible only upon breaking the adjacent sealed portion of the bulb.

11. A theft-proof electric lamp for use with a conventional electrical receptacle comprising a bulb member having a threaded contact shell permanently secured against rotation and longitudinal movement in respect thereto and shaped to be received by a conventional form of fixed threaded receptacle shell, and locking means forming a permanent part of the lamp and having a beveled spring pressed detent capable of substantially penetrating the metal wall of the receptacle shell contact and extending from said threaded shell of the lamp in a direction whereby the lamp may be freely inserted into the receptacle but upon exerting force to turn the lamp out of the receptacle said detent will be held fast in positive engagement with the receptacle shell wall and secure the lamp against removal.

12. A theft-proof electric lamp for use with a conventional electrical receptacle comprising a bulb member having a threaded shell contact permanently fixed against rotation in respect thereto and shaped to be received by the conventional threaded receptacle shell, and a wire detent member having a spring arm extending substantially circumferentially along the wall of the lamp shell with one end made fast to the lamp shell and its other end pointed and normally forced outwardly by said spring arm for biting into positive engagement with a fixed receptacle shell when rotational force is exerted to turn the lamp outwardly of the receptacle.

13. In a theft-proof lamp of the type described, a bulb member, and a threaded shell contact mounted thereon and provided with key engaging means for facilitating release of the contact from a receptacle, said key engaging means being positioned to be accessible, when the contact is in a receptacle, only from within the base of the lamp upon breakage of the bulb.

14. A theft-proof replaceable electrical device comprising a frangible enclosure having delicate electrical apparatus therein, a cylindrical threaded shell supporting contact permanently made fast directly to the enclosure for engaging the conventional form of threaded electrical receptacle, and a detent member comprising a spring arm with one end made fast to the shell and its other end pointed and normally forced outwardly by said spring arm for effecting substantial penetration of the adjacent concave interior wall surface of the conventional receptacle when rotational force is exerted to turn the shell outwardly of the receptacle, thereby locking the enclosure against movement.

In testimony whereof we have hereunto affixed our signatures.

WILBUR M. REECE.
CARL E. TOMLINSON.